(12) United States Patent
Gumpoltsberger

(10) Patent No.: US 7,156,768 B2
(45) Date of Patent: Jan. 2, 2007

(54) MULTI-STAGE TRANSMISSION

(75) Inventor: Gerhard Gumpoltsberger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/758,479

(22) Filed: Jan. 15, 2004

(65) Prior Publication Data

US 2004/0147360 A1  Jul. 29, 2004

(30) Foreign Application Priority Data

Jan. 21, 2003 (DE) ................ 103 02 023

(51) Int. Cl.
*F16H 3/44* (2006.01)
(52) U.S. Cl. ..................... 475/296; 475/284
(58) Field of Classification Search ........ 475/275–292, 475/296, 311–325
See application file for complete search history.

(56) References Cited

U.S. PATENT DOCUMENTS

| | | | | |
|---|---|---|---|---|
| 4,070,927 | A * | 1/1978 | Polak ......................... | 475/286 |
| 5,106,352 | A | 4/1992 | Lepelletier .................. | 475/280 |
| 5,435,792 | A | 7/1995 | Justice et al. ............... | 475/276 |
| 5,460,579 | A | 10/1995 | Kappel et al. .............. | 475/276 |
| 5,478,292 | A * | 12/1995 | Sato et al. .................. | 475/293 |
| 5,931,757 | A * | 8/1999 | Schmidt ....................... | 475/2 |
| 6,572,507 | B1 | 6/2003 | Korkmaz et al. ........... | 475/276 |
| 6,634,980 | B1 | 10/2003 | Ziemer ....................... | 475/275 |
| 6,672,988 | B1 * | 1/2004 | Raghavan et al. .......... | 475/276 |
| 6,705,967 | B1 * | 3/2004 | Raghavan et al. .......... | 475/275 |
| 6,736,752 | B1 * | 5/2004 | Usoro et al. ................ | 475/296 |
| 6,860,831 | B1 * | 3/2005 | Ziemer ....................... | 475/296 |
| 6,887,178 | B1 * | 5/2005 | Miyazaki et al. ........... | 475/276 |
| 6,905,435 | B1 * | 6/2005 | Nielsen ....................... | 475/276 |
| 6,908,408 | B1 * | 6/2005 | Nielsen ....................... | 475/279 |

FOREIGN PATENT DOCUMENTS

DE    44 05 048 A1    9/1994

(Continued)

OTHER PUBLICATIONS

Tenberge, Prof. Dr., "E-Automat Automatikgetriebe mit Esprit", *VDI-Berichte*, No. 1610, (2001), pp. 455-479.

*Primary Examiner*—Tisha Lewis
(74) *Attorney, Agent, or Firm*—Davis & Bujold, P.L.L.C.

(57) ABSTRACT

The multi-stage transmission comprises a drive input shaft and a drive output shaft, three single-web planetary gearset assemblies (P1, P2, P3), at least six rotating shafts (1, 2, 3, 4, 5, 6) and at least five shift elements (03, 04, 13, 16, 45) so that six forward gears and one reverse gear can be engaged, such that the drive input shaft (1) is connected to the solar gearwheel of the first planetary gearset (P1), the annular gearwheel of the first planetary gearset (P1) is in rotationally fixed connection with the housing, the drive output shaft (2) is connected to the annular gearwheel of the second planetary gearset (P2) and to the web of the third planetary gearset (P3), and the shaft (3) is permanently connected to the web of the second planetary gearset (P2) and to the annular gearwheel of the third planetary gearset (P3). The shaft (4) is permanently connected to the solar gearwheel of the second planetary gearset (P2), the shaft (5) is permanently connected to the web of the first planetary gearset (P1), and the shaft (6) is permanently connected to the solar gearwheel of the third planetary gearset (P3). The planetary gearset assemblies (P1, P2, P3) are coupled by means of shafts (0, 1, 2, 3, 4, 5, 6) and shift elements (03, 04, 13, 16, 45).

23 Claims, 3 Drawing Sheets

FOREIGN PATENT DOCUMENTS

| DE | 199 12 480 A1 | 9/2000 |
| DE | 199 49 507 A1 | 4/2001 |
| DE | 101 15 983 A1 | 10/2002 |
| EP | 0 434 525 A1 | 6/1991 |
| EP | 1 118 798 A2 | 7/2001 |
| JP | 2000291747 A | 10/2000 |

* cited by examiner

MULTI-STAGE TRANSMISSION

The application claims priority from German Application Serial No. 103 02 023.3 filed Jan. 21. 2003.

FIELD OF THE INVENTION

The present invention concerns a multi-stage transmission of planetary structure, in particular an automatic transmission for a motor vehicle.

BACKGROUND OF THE INVENTION

Automatic transmissions of the prior art, in particular for motor vehicles, comprise planetary gearset assemblies which are engaged by means of frictional or shift elements such as clutches and brakes and are usually connected to a starting element such as a hydrodynamic torque converter or a fluid clutch that can operate with some slipping action and is optionally provided with a bridging clutch.

Such a transmission is described in EP 0 434 525 A1. It comprises essentially a drive input shaft and a drive output shaft arranged parallel to one another, a dual planetary gearset assembly concentric to the drive output shaft, and five shift elements in the form of three clutches and two brakes, whose selective engagement, two at a time, determines the various gear transmission ratios between the drive input and drive output shafts.

Furthermore, from DE 199 495 07 A1 by the present applicant a multi-stage transmission is known, in which two non-shifting main gearset combinations are provided, which produce two rotation speeds on the output side which, besides the speed of the drive input shaft, can optionally be engaged with a shiftable dual planetary gearset assembly that acts on the drive output shaft, by selectively closing the shift elements used in such manner that to shift from one gear to the respective next gear up or down, only one shift element of the two shift elements actuated at the time has to be engaged or disengaged.

In addition, within the scope of EP 0 434 525 A1 a multi-stage transmission is disclosed, which contains a drive input shaft and a drive output shaft arranged in a housing, a planetary gearset assembly arranged concentrically with the drive output shaft consisting of four elements denoted as from the first to the fourth in the order of their speed, i.e. a so-termed double planetary gearset assembly, and five shift elements, namely three clutches and two brakes, whose selective actuation in pairs determines various transmission ratios between the drive input and drive output shafts, such that the transmission has two power paths which enable six forward gears to be engaged by the selective actuation of the five shift elements two at a time.

The purpose of the present invention is to propose a multi-stage transmission of the type described at the start, in which the structural elaboration is optimised and, in addition, the efficiency in the main gears is improved in relation to slippage and gearing losses.

SUMMARY OF THE INVENTION

According to the invention, the multi-stage transmission of planetary structure comprises a drive input shaft and a drive output shaft arranged in a housing, at least three single-web planetary gearset assemblies, at least six rotating shafts and at least five shift elements, preferably two brakes and three clutches or three brakes and two clutches, whose selective engagement in pairs produces various transmission ratios between the drive input and the drive output shafts, so that preferably six forward gears and one reverse gear can be engaged.

In this case the drive input shaft is connected directly or via a clutch to the solar gearwheel of the first planetary gearset. In addition, the drive output shaft is connected to the annular gearwheel of the second planetary gearset and to the web of the third planetary gearset, and another shaft is permanently connected to the web of the second planetary gearset and to the annular gearwheel of the third planetary gearset.

In a first embodiment the annular gearwheel of the first planetary gearset is in rotationally fixed connection with the housing. Further, it is provided that another shaft is permanently connected to the solar gearwheel of the second planetary gearset, a further shaft is permanently connected to the web of the first planetary gearset, and another shaft is permanently connected to the solar gearwheel of the third planetary gearset.

In a second advantageous embodiment a shaft is permanently connected to the solar gearwheel of the second planetary gearset and to the web of the first planetary gearset, and another shaft is permanently connected to the solar gearwheel of the first planetary gearset. In addition, it is provided that a further shaft is permanently connected to the solar gearwheel of the third planetary gearset. Both the first and the second embodiment comprise two brakes and three clutches as shift elements.

Furthermore a third embodiment is proposed, which comprises three brakes and two clutches. In this case the annular gearwheel of the first planetary gearset can be connected to and released from the housing by a brake; a shaft is permanently connected to the solar gearwheel of the second planetary gearset, another shaft is permanently connected to the annular gearwheel of the first planetary gearset, and a further shaft is permanently connected to the solar gearwheel of the third planetary gearset.

In all the embodiments the planetary gearset assemblies, preferably made as negative planetary gearset assemblies, are coupled by shift elements and/or shafts.

Thanks to the construction according to the invention, suitable transmission ratios and a considerable increase of the overall spread of the multi-stage transmission are obtained, which results in increased driving comfort and a significant reduction of fuel consumption.

The multi-stage transmission according to the invention is suitable for any motor vehicle, in particular for passenger cars and goods vehicles such as trucks, buses, construction industry vehicles, rail vehicles, caterpillar track vehicles and suchlike.

Moreover, with the multi-stage transmission according to the invention, the structural elaboration is reduced considerably by having a small number of shift elements, namely preferably only three clutches and two brakes or two clutches and three brakes.

Advantageously, the multi-stage transmission according to the invention makes it possible to start up with a hydrodynamic converter, an external starting clutch or even some other suitable external starting element. It is also conceivable to enable a starting process with a starting element integrated in the transmission. Furthermore, the multi-stage transmission according to the invention operates with high efficiency in relation to slippage and gearing losses.

In addition, the torques in the shift elements and even in the planetary gearset assemblies are small. This reduces wear in the multi-stage transmission in a particularly advantageous way. Owing to the low torques in the shift elements and planetary gearset assemblies the transmission can be made smaller, which optimises the use of structural space and leads to cost reduction.

Furthermore, the transmission according to the invention is designed to allow adaptability to various drive train designs, both in the force-flow direction and from the standpoint of space.

BRIEF DESCRIPTION OF THE DRAWINGS

The invention will now be described, by way of example, with reference to the accompanying drawings in which.

DETAILED DESCRIPTION OF THE INVENTION

Figure 1:
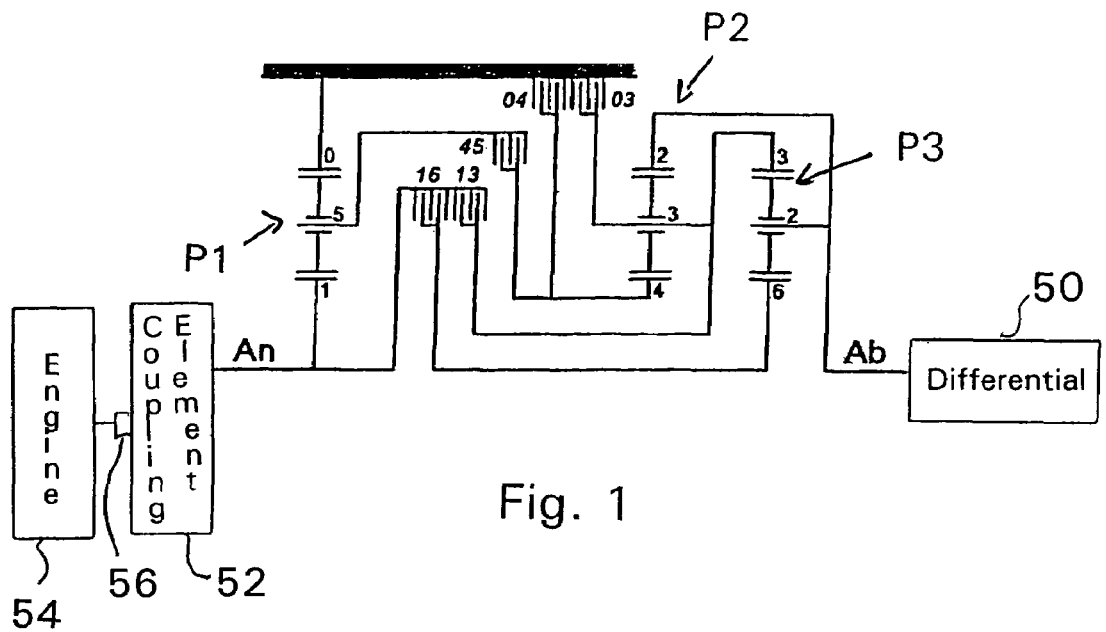
FIG. 1 is a schematic view of an example embodiment of a multi-stage transmission according to the invention.

According to FIG. 1, the multi-stage transmission of planetary structure according to the invention comprises a drive input shaft 1 (An) and a drive output shaft 2 (Ab), which are arranged in a housing, and three single-web planetary gearset assemblies P1, P2 and P3. The planetary gearsets P1, P2 and P3 are preferably made as negative planetary gearset assemblies. In addition, six rotating shafts 1, 2, 3, 4, 5 and 6 and five shift elements, namely two brakes 03, 04 and three clutches 13, 16, 45 are provided, whose selective actuation two at a time brings about various transmission ratios between the drive input shaft and the drive output shaft, so that six forward gears and one reverse gear can be engaged.

As can be seen from FIG. 1, the drive input shaft 1 is connected directly to the solar gearwheel of the first planetary gearset P1 and the annular gearwheel of the first planetary gearset P1 is permanently in rotationally fixed connection with the housing (shaft 0). The drive output shaft 2 is connected to the annular gearwheel of the second planetary gearset P2 and to the web of the third planetary gearset P3, and the shaft 3 is permanently connected to the web of the second planetary gearset P2 and to the annular gearwheel of the third planetary gearset P3. Further, the shaft 4 is permanently connected to the solar gearwheel of the second planetary gearset P2, the shaft 5 is permanently connected to the web of the first planetary gearset P1, and the shaft 6 is permanently connected to the solar gearwheel of the third planetary gearset P3.

According to the invention, the shafts 3 and 4 can be coupled to the housing by the brakes 03 and 04 respectively; the clutch 13 connects the shafts 1 and 3 to or releases them from one another, and the clutch 16 connects the shafts 1 and 6 to or releases them from one another, while the clutch 45 connects the shafts 4 and 5 to or releases them from one another.

Figure 2:
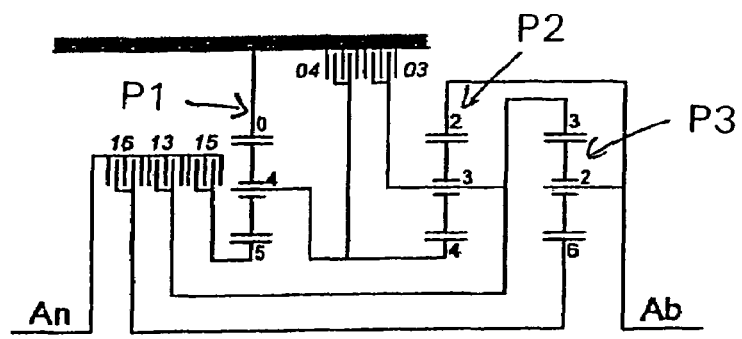
FIG. 2 is a schematic view of a second example embodiment of a multi-stage transmission according to the invention.

The embodiment shown in FIG. 2 differs from the embodiment according to FIG. 1 in that the drive input shaft is not connected directly to any planetary gearset, and the shaft 4 is additionally connected to the web of the first planetary gearset P1. Further, the shaft 5 is permanently connected to the solar gearwheel of the first planetary gearset P1. Instead of the clutch 45, a brake 05 is provided which connects the shaft 5 to or releases it from the housing.

The fixed connection of the web of the first planetary gearset P1 to the housing, as in the two embodiments already explained, can be replaced by a releasable connection, for example a brake.

This enables an electric motor or other suitable additional drive source to be arranged on the shaft 0 released by means of the brake.

Figures 3, 4:
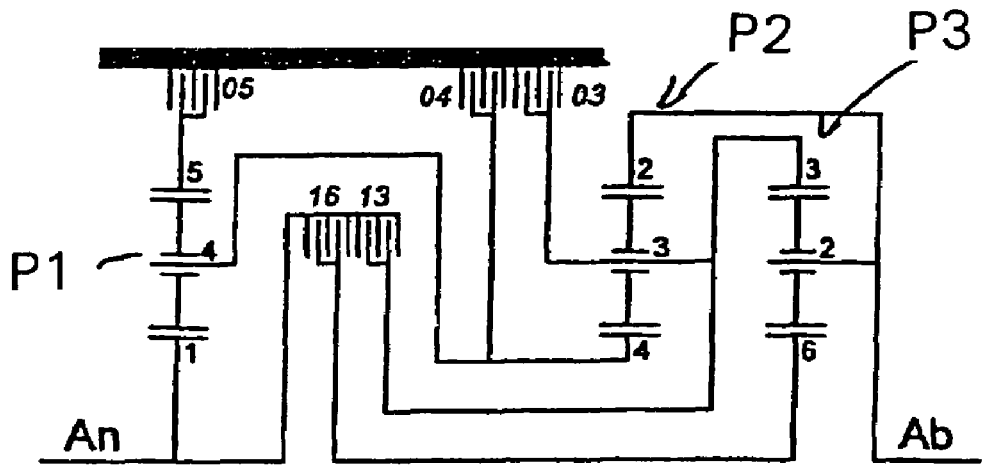
FIG. 3 is a schematic view of a third example embodiment of a multi-stage transmission according to the invention.
FIG. 4 is a shift scheme for the multi-stage transmission according to the invention, as illustrated in FIGS. 1, 2, and 3.
Figure 5:
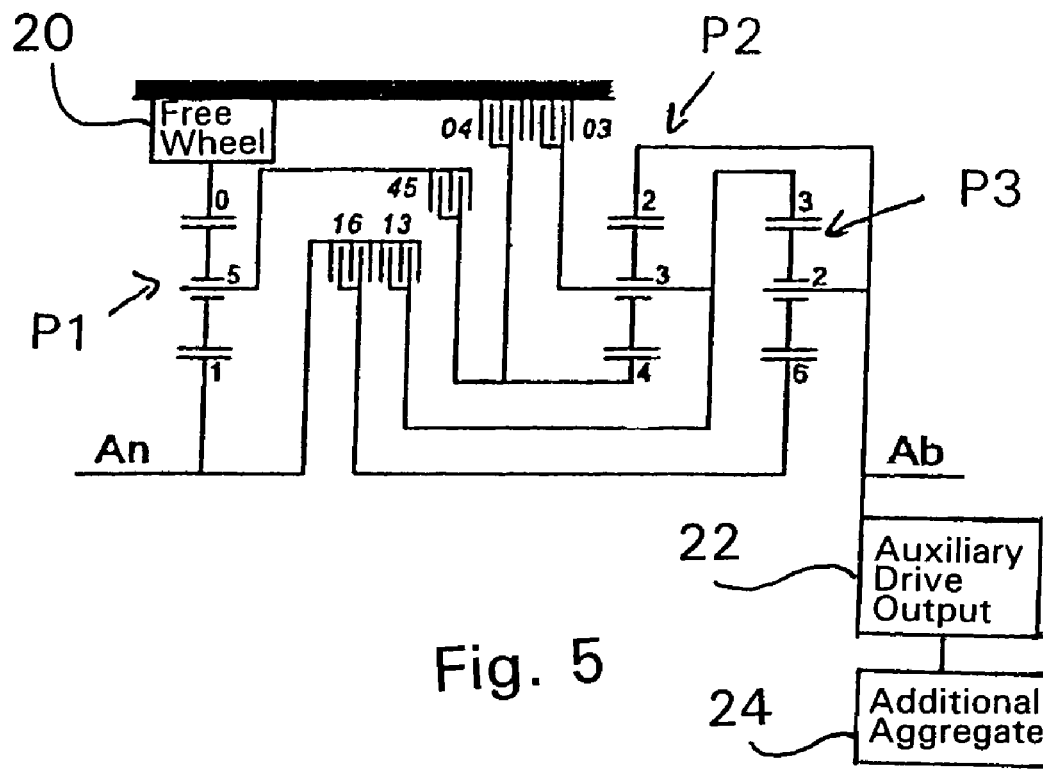
Figure 6:
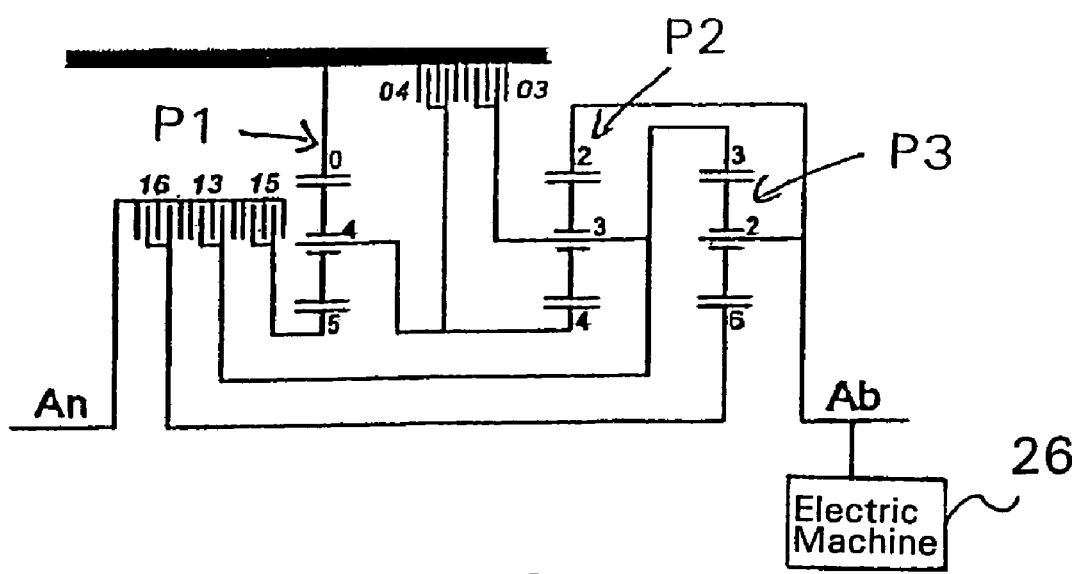

FIG. 3 shows another example embodiment of a multi-stage transmission of planetary structure according to the present invention, which differs from the example embodiment of FIG. 1 in that the shaft 4 is additionally connected to the web of the first planetary gearset P1 and the shaft 5 is permanently connected to the annular gearwheel of the first planetary gearset P1. As can be seen from the figure, instead of the clutch 45 a clutch 15 is provided, which connects the shafts 1 and 5 to or releases them from one another.

The corresponding shift scheme of the example embodiments discussed above is the object of FIG. 4, in which, as examples, transmission ratios i and the resulting speed transitions f are also indicated.

As shown, the multi-stage transmission according to the invention has a progressive gear variation. Furthermore, when shifting sequentially double-shifts are avoided, since two adjacent gears in each case use only one common shift element. Furthermore, any desired shift between the first and fourth gear and between the fourth and the sixth gear involves the actuation of only one shift element. In the first embodiment shown in FIG. 1, for gears 1 to 4 the clutch 16 is permanently actuated; these gears are engaged by the additional actuation of the brake 03 (first gear), the brake 04 (second gear), the clutch 45 (third gear) and the clutch 13 (fourth gear). For gears 4 to 6, the clutch 13 remains closed and the gears are engaged by the additional actuation of the clutch 45 (fifth gear) and the brake 04 (sixth gear). According to the invention, engaging the reverse gear requires the actuation of the brake 03 and the clutch 45.

The shift scheme for the embodiments of FIGS. 2 and 3 is analogous, with the difference that instead of the clutch 45, the brake 05 or the clutch 15 is actuated.

According to the invention, at any suitable point in the multi-stage transmission additional freewheels can be provided, for example between a shaft and the housing or in order to divide or to connect a shaft.

In addition, thanks to the structure according to the invention the drive input and output shafts can be arranged either on the same side of the transmission or on opposite sides. In addition, an axle differential or a transfer differential can also be arranged on the drive input or drive output of the transmission.

In an advantageous further development, the drive input shaft can if necessary be separated from a drive motor by a coupling element, and as that coupling element a hydrodynamic converter, a hydraulic clutch, a dry starter clutch, a fluid starter clutch, a magnetic powder clutch or a centrifugal clutch can be used.

Such a starting element can also be arranged after the transmission, and in that case the drive input shaft is in fixed connection with the crankshaft of the engine. According to the invention, starting can also take place by means of a shift element of the transmission, preferably by means of the brake 04, the brake 03 or the clutch 16.

The multi-stage transmission according to the invention also enables a torsional oscillation damper to be arranged between the engine and the transmission.

In a further embodiment of the invention (not illustrated), a wear-free brake can be arranged on any shaft, preferably in the drive input shaft or the drive output shaft, and this is of particular importance especially for use in goods vehicles. An auxiliary drive output can also be provided on any shaft for driving additional aggregates.

The shift elements used can be made as change-under-load clutches or brakes; however, disk brakes, band brakes and/or conical clutches can also be used. Furthermore, form-enclosing brakes and/or clutches such as synchromesh or claw clutches can be used.

A further advantage of the multi-stage transmission proposed here is that an electric machine can be connected to any shaft as a generator and/or as an additional drive.

Clearly, any design structure and in particular any spatial arrangement of the planetary gearset assemblies and shift elements in their own right and relative to one another, provided it is technically appropriate and does not affect the function of the transmission as indicated in the claims, falls under the protection scope of the present claims even if the said structures are not explicitly indicated in the figures or the description.

As shown in FIG. 1, one of an axle differential and a transfer differential (only diagrammatically shown as element 50 in this Figure) is arranged on one of a drive input side An or on a drive output side Ab of the housing. In addition, a coupling element 52 allows the drive input shaft (1) to be disengagable from the drive engine 54. If desired, a torsional oscillation damper (only diagrammatically shown as element 56 in this Figure) may-be arranged between the engine 54 and the transmission.

REFERENCE NUMERALS

0 Shaft
1 Shaft
2 Shaft
3 Shaft
4 Shaft
5 Shaft
6 Shaft
03 Brake
04 Brake
05 Brake
13 Clutch
15 Clutch
16 Clutch
45 Clutch
P1 planetary gearset
P2 planetary gearset
P3 planetary gearset
An Drive input
Ab Drive output
i Transmission ratio
f Speed change

The invention claimed is:

1. A multi-stage transmission of planetary structure for a motor vehicle which comprises a drive input shaft and a drive output shaft arranged in a housing, three single-web planetary gearset assemblies (P2, P2, P3), at least six rotating shafts (0, 1, 2, 3, 4, 5, 6) and at least five shift elements (03, 04, 13, 16, 45) which comprise one of brakes and clutches, whose selective engagement, two at a time, produce various transmission ratios between the drive input and the drive output shafts so that six forward gears and one reverse gear can be engaged; wherein the drive input shaft (1) is connected directly to a sun gearwheel of a first planetary gearset assembly (P1), an annular gearwheel of the first planetary gearset assembly (P1) is connected with the housing, a drive output takes place via a second shaft (2) which is connected to an annular gearwheel of a second planetary gearset assembly (P2) and to a web of a third planetary gearset assembly (P3), a third shaft (3) is permanently connected to a web of the second planetary gearset assembly (P2) and to an annular gearwheel of the third planetary gearset assembly (P3), a fourth shaft (4) is permanently connected to a sun gearwheel of the second planetary gearset assembly (P2), a fifth shaft (5) is permanently connected to a web of the first planetary gearset assembly (P1), and a sixth shaft (6) is permanently connected to a sun gearwheel of the third planetary gearset assembly (P3), such that the third shaft (3) can be coupled to the housing by a first brake (03), the fourth shaft (4) can be coupled to the housing by a second brake (04), a first clutch (13) facilitates connection and disconnection of the drive input shaft (1) and the third shaft (3) with one another, a second clutch (16) facilitates connection and disconnection of the drive input shaft (1) and sixth shaft (6) with one another, and a third clutch (45) facilitates connection and disconnection of the fourth and the fifth shafts (4, 5) with one another and the first and second brakes (03, 04) and the first, the second and the third clutches (13, 16, 45) are all located between the first and the second planetary gearset assemblies (P1, P2).

2. The multi-stage transmission according to claim 1, wherein the planetary gearsets (P1, P2, P3) are negative planetary gearset assemblies.

3. The multi-stage transmission according to claim 1, wherein the connection of the annular gearwheel of the first planetary gearset (P1) to the housing is formed by a releasable connection by a brake.

4. The multi-stage transmission according to claim 3, wherein one of an electric machine and an additional drive machine is arranged on a seventh shaft (0) associated with the housing.

5. The multi-stage transmission according to claim 1, wherein at least one freewheel is provided within the transmission.

6. The multi-stage transmission according to claim 5, wherein a plurality freewheels is inserted between the first, the second, the third, the fourth, the fifth, the sixth and the seventh shafts (0, 1, 2, 3, 4, 5, 6) and the housing.

7. The multi-stage transmission according to claim 1, wherein the drive input and the drive output are provided on a same side of the housing.

8. The multi-stage transmission according to claim 1, wherein the drive input and drive output are provided on opposite sides of the housing.

9. The multi-stage transmission according to claim 1, wherein at least one axle differential and a transfer differential is arranged on one of a drive input side or on a drive output side of the housing.

10. The multi-stage transmission according to claim 1, wherein the drive input shaft (1) is disengagable from a drive engine by a coupling element.

11. The multi-stage transmission according to claim 10, wherein the coupling element is one of a hydrodynamic converter, a hydraulic clutch, a dry starter clutch, a liquid starter clutch, a magnetic powder clutch and a centrifugal force clutch.

12. The multi-stage transmission according to claim 1, wherein in a force-flow direction an external starting element is arranged after the housing such that the drive input shaft (1) is in fixed connection with the crankshaft of the drive engine.

13. The multi-stage transmission according to claim 1, wherein starting takes place by a shift element of the transmission, and the crankshaft of the engine is permanently connected to the drive input shaft (1).

14. The multi-stage transmission according to claim 13, wherein at least one of the second brake (04), the first brake (03) and the clutch (16) are used as the shift element.

15. The multi-stage transmission according to claim 1, wherein a torsional oscillation damper is arranged between the engine and the transmission.

16. The multi-stage transmission according to claim 1, wherein a wear-free brake is arranged on at least one of the rotating shafts.

17. The multi-stage transmission according to claim 16, wherein the wear-free brake is arranged on at least one of the drive input shaft (1) and the drive output shaft (2).

18. The multi-stage transmission according to claim 1, wherein an auxiliary drive output is arranged on at least one of the rotating shafts to drive an additional aggregate of the multi-stage transmission.

19. The multi-stage transmission according to claim 18, wherein the auxiliary drive output is arranged on one of the drive input shaft (1) and on the drive output shaft (2).

20. The multi-stage transmission according to claim 1, wherein the shift elements are formed as one of change-under-load clutches and brakes.

21. The multi-stage transmission according to claim 20, wherein the shift elements are one of disk clutches, band brakes and conical clutches.

22. The multi-stage transmission according to claim 1, wherein the shift elements are one of form-enclosing brakes and clutches.

23. The multi-stage transmission according to claim 1, wherein an electric machine is connected to one of the rotating shafts and functions as one of a generator and an additional drive machine.

* * * * *